United States Patent [19]

Plakosh

[11] Patent Number: 5,701,151
[45] Date of Patent: Dec. 23, 1997

[54] SYSTEM FOR POSITIONING AN IMAGE IN A DIGITAL PRINTER

[75] Inventor: David Plakosh, Rochester, N.Y.

[73] Assignee: Xerox Corporation, Stamford, Conn.

[21] Appl. No.: 550,257

[22] Filed: Oct. 30, 1995

[51] Int. Cl.$^6$ ............................................. H04N 1/21
[52] U.S. Cl. ...................................... 347/247; 395/116
[58] Field of Search ................................. 347/247, 237;
395/101, 109, 117, 115, 116, 111, 105;
358/296, 298, 300, 302

[56] References Cited

U.S. PATENT DOCUMENTS 5,570,464  10/1996  Fuse ................................... 395/105

*Primary Examiner*—Mark J. Reinhart
*Attorney, Agent, or Firm*—R. Hutter

[57] ABSTRACT

A digital printing apparatus accepts image data in the form of PDL files, and also instructions, external to each PDL file, about shifting images formed at the PDL file to precise positions on a print sheet. The PDL file is interpreted to yield a raw bitmap, and then compressed according to a compression algorithm. The external shift instructions are then included in the compressed data as blank-line instructions which add a number of blank lines equal to a number of scan lines the image is desired to be shifted. The shifting is useful for accommodating bindings in the finished printed documents.

10 Claims, 2 Drawing Sheets

SYSTEM FOR POSITIONING AN IMAGE IN A DIGITAL PRINTER

The present invention relates to digital printing systems, in which image data, in digital form, is submitted to a printer. More specifically, the present invention is directed to a technique for controlling the precise placement of a desired image on a print sheet.

Digital printers, in which image data in digital form is submitted from a computer to be printed on a sheet on demand, are well known. Digital printing can exist in low-end forms, such as an ink-jet or laser printer connected to a single personal computer, or can be in the form of a high-volume printing apparatus available to large numbers of independent computers over a network.

In the current market of digital printing, it is very common that image data being sent to a particular printing apparatus is in the form of a page description language, or PDL. Common commercially-available PDL's include HP-PCL and PostScript (PostScript is a trademark of Adobe Systems, Inc.). A PDL can be said to represent a highly compressed form of digital image data, typically largely comprising a list of alphanumeric characters to be printed in a certain font at a certain character size. When the list of characters of the desired image is submitted to a "PDL interpreter," the interpreter used each listed character name to create a bitmap of the desired character, of the correct font and character size. The PDL interpreter typically resides in the same "box" as the printing hardware. The individual bitmaps corresponding to each character reside with the PDL interpreter, so that only the list of character bitmaps to be invoked sent to the printer.

PDL's also include instructions on exactly where in each image area (such as on a page to be printed) a particular character or set of characters are to be placed. These position instructions are, of course, useful in setting the margins of text, etc. However, in certain printing contexts, it is desirable to in effect "override" the instructions within a PDL file to print characters in certain precisely-defined locations in a page image. A common example of a need to override instructions within a PDL file is if it is desired to print out the PDL file in bound pages. Taking for example a page which is desired to be printed on the right-hand-side page of a bound booklet, it is not unusual to require that the margins of the text be effectively shifted about ½ inch to the right, so that the left margin of the text will not be too close to the binding on the left edge of the page. In digital printing context, different users may have different desires as to how the final product is to be printed: some users will print out a document and simply staple the upper left-hand corner, while other clients will want to print the same document in a bound format, which would require the text to be shifted ½ inch to the right. Therefore, in situations where a single document, in the form of a PDL file, is printed in a highly distributed manner by different printing apparatus, it is desirable that such shifts in the position of images on sheets, such as to accommodate binding, be able to be performed at a point far downstream in the printing process, such as at the printer site. It is further desirable that this at-site decision on whether to change the position of images being printed be performed in a manner which does not require modifying the original PDL file being sent out. That is, in a highly-distributed printing environment, it is desirable to have a document in the form of a single PDL file which would not have to be entered and changed by the distributed clients for printing on their own individual equipment.

According to the present invention, there is provided, in a digital printing apparatus wherein an image is formed on a surface in response to imagewise digital data submitted as a PDL file, a method and apparatus for manipulating the digital data to position the image on the surface. A PDL file submitted to the apparatus is interpreted to yield a raw bitmap. Shift instructions for positioning the image on the surface are detected, the shift instructions reciting a number of scan lines that the image is desired to be shifted. The raw bitmap is compressed according to a compression algorithm, to yield a compressed bitmap. Blank-line instructions, according to the compression algorithm, are added to the compressed bitmap for adding a number of blank lines equal to the number of scan lines the image is desired to be shifted.

Figure 1:
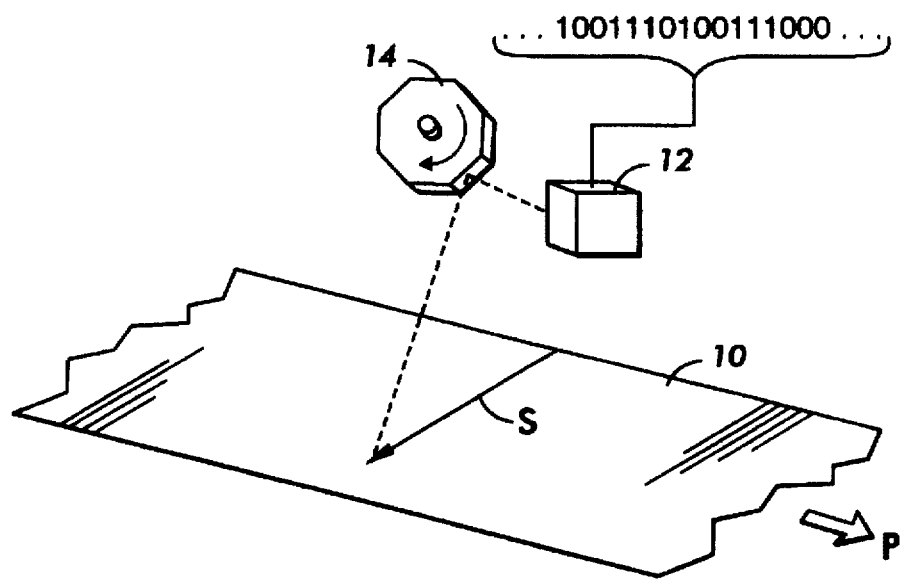
FIG. 1 is a simplified perspective view showing the essential elements of a raster-output scanner which may be used in conjunction with the present invention.

FIG. 1 is a simplified perspective view of essential attributes of a digital printing apparatus, explaining the interaction of bitmap data with which an image is formed on a surface. As used in the claims herein, a "surface" could refer, by way of example and not limitation, to a charge-retentive surface, such as a photoreceptor in a laser printer or charge receptor in an ionographic printer, or alternately, could represent the actual print sheet in an ink-jet printing apparatus. Specifically, FIG. 1 shows the essential elements of an electrophotographic printer with a polygon raster output scanner. The raster output scanner, or ROS, creates an electrostatic latent image on a moving photoreceptor belt 10, which moves continuously in a process direction P. As is known in the art of electrophotographic printing, this photoreceptor 10 is initially uniformly charged, and then certain "print-white" areas of the image desired to be printed are discharged by means of a laser, here indicated as 12. The laser 12 directs a beam toward a rotating reflective polygon 14, which in turn directs the beam along a scan direction S which is typically parallel to process direction P. The effect of a large number of scan lines S being made along a continuously-moving photoreceptor 10 is to a create a large number of abutting scan lines, which together form a raster of the desired image. In order to render a desired image, there is ultimately submitted to laser 12 a sequence of digital data in the form of 1's and 0's which instruct the laser 12 to modulate (that is, turn on and off) at various times according to the image data.

Figure 2:
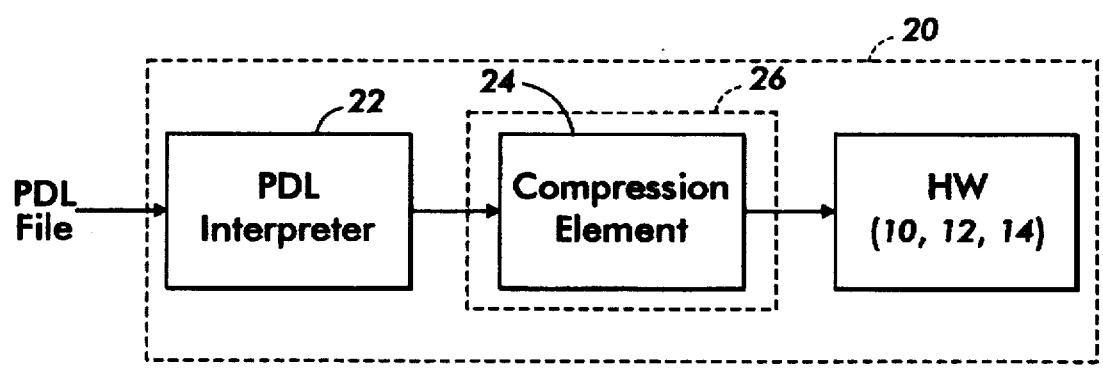
FIG. 2 is a systems diagram showing the essential elements of a digital printing apparatus, relevant to the present invention.

FIG. 2 is a systems diagram showing the relevant elements of a printing apparatus, from the perspective of a user submitting digital data representing an image desired to be printed. The printer on the whole is indicated as 20. A user, whether in a stand-alone situation or through a network, submits to printer 20 image data in the form of a PDL file, such as in HP-PCL or PostScript, in a manner known in the art. The first stop for the PDL file is a PDL interpreter 22. The PDL interpreter is a system which includes an algorithm for converting the PDL file into typically a "raw bitmap" form: the set of 1's and 0's which provide specific instructions to a laser source such as 12 (or, in another embodiment, an ink-jet printhead) to turn on and off at specific times in order to render the desired image. As is well known, a raw bitmap represents a large amount of data: a typical letter-sized image at a 600 spi resolution requires 4 MB of data. In a common embodiment, the raw bitmap from PDL interpreter 22 is then compressed by a compression element 24. The compression is carried out by a compression algorithm, which substitutes compression code for scanline data. (In one practical embodiment, a proprietary "Xerox Adaptive" compression algorithm is used; another common algorithm is known as CCITT.) The compression ratio is dependent on the complexity of the image data. For simple data such a a scanline of zeros representing a "white line," the algorithm would use compressioncode to represent the data.

The compression element 24 typically sits within a buffer manager, here indicated as 26, which may further include a buffer for temporarily retaining the raw bitmap at a PDL interpreter 22 until it is compressed by compression element 24. The compressed bitmap is eventually sent to printer hardware, such as laser 12, when it is desired to be printed. It is a common convention of currently-available printer hardware that the hardware include a decompression element associated therewith, so that the hardware itself accepts not the raw bitmap but compressed data: in effect, the compressed image data is decompressed at the last moment before submission to a physical imager such as laser 12, or an ink-jet printhead.

Figure 3A:
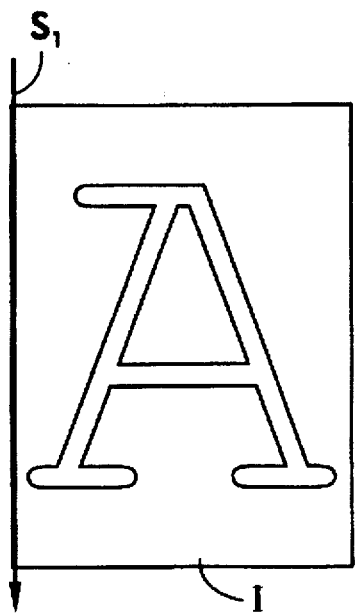
FIGS. 3A and 3B are plan views of an image area, illustrating the shifting principle of the present invention.
Figure 3B:
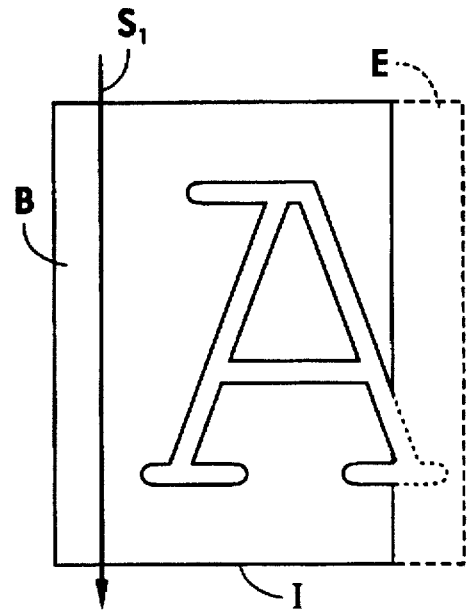

FIGS. 3A and 3B illustrate the principle of the "image shift" referenced above, in which it may be occasionally desired that an image formed on a surface such as a photoreceptor 10 or directly on a print sheet be entirely shifted in position, such as in order to accommodate, for example, a binding on the left-hand edge of the printed sheet. As illustrated in the Figures, an image desired to be printed, such as the capital A in image area I is formed by the collective action of a series of scan lines made by the imaging apparatus on the surface. The scan line such as $S_1$ should be construed not only as a physical scan line, such as created by the action of a laser or of an ink-jet printhead, but also as representing a quantity of image data which has instructed the laser or printhead to form the portion of the image in each scan line. Thus, a scan line such as $S_1$ represents the beginning of a data set by which the image desired to be printed is embodied in digital data. The first scan line $S_1$, being the first scan line created in the image, also represents, in this particular example, the left-hand edge of the image desired to be printed. The location of first scan line $S_1$ therefore represents the left-hand border of the image.

In the example of FIG. 3A, there is shown the image to be printed in image area I where there is no shift of the image. In such a case, the first scan line $S_1$ of the data forming the image is aligned with the left border of image I. An unshifted image as shown in FIG. 3A is typically the form in which the image data is rendered in an original PDL file.

If, however, a particular user on a network desiring to print out a particular image wants to shift the original image in the PDL file, for example, ½ inch to the right, such as to accommodate a binding, the first scan line $S_1$ and all following scan lines must effectively be moved a half inch to the right as well, as shown in FIG. 3B. Because of the fixed size of the image area I, pushing the first scan line $S_1$ to the right, as shown in FIG. 3B, will push the right-hand portion of the image effectively off the image area. In FIG. 3B, the edge of the A has been cut off for illustration purposes, but in the context of printing text with margins, such a shifting is typically not so conspicuous.

When an image is shifted to the right as shown in FIG. 3B, the effect from a data perspective is that the "end data" forming the right hand portion of the image indicated as E is effectively cut off or discarded. Simultaneously, there must be added, before the image of the first scan line $S_1$, some blank-line instructions to fill up, in a data sense, the area to the left of the line $S_1$. In brief, when there is a shift of the image, the end of the image data E is cut off while a new beginning, such as forming portion B of the image, must be added.

As mentioned above, it is an object of the present invention to provide a system whereby the desired shift of an image to be printed, such as shown in FIG. 3B, can be performed at the site of the printer itself, and without modifying the original PDL image, such as shown in FIG. 3A. In other words, it is desirable to treat the original PDL file, which may have come from elsewhere on the network, as a "black box" which can be manipulated at an individual printer as needed, without requiring any instructions to shift the image to be embedded in the original PDL file.

Figure 4:
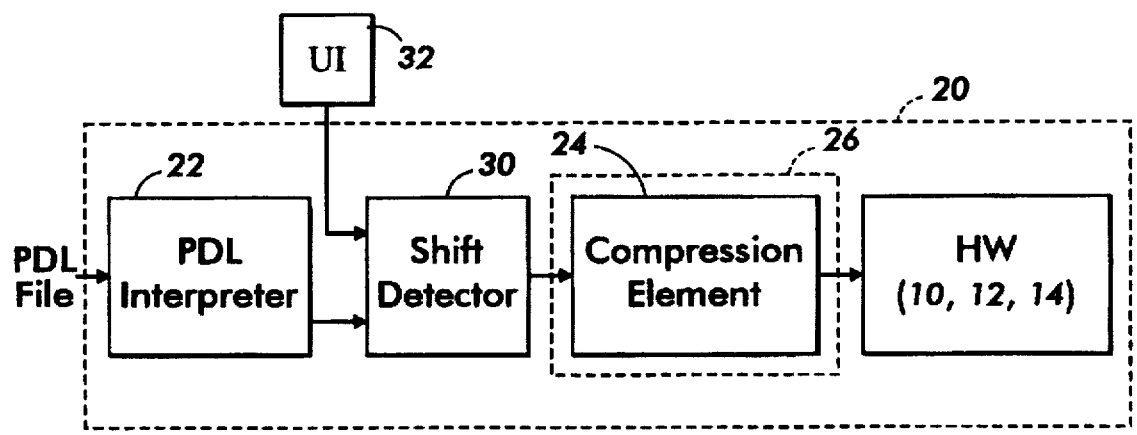
FIG. 4 is a systems diagram showing the essential elements of a printing apparatus incorporating the present invention.

According to the present invention, there is provided a shift detector within an individual printer 20, which accepts externally-provided instructions to shift or otherwise reposition an image in a PDL file. FIG. 4 shows the essential elements of a printer incorporating the present invention. In FIG. 4, the elements common to those shown in FIG. 2 above have identical functions. There is added in the printer of FIG. 4, a shift detector 30, which is interposed between the PDL interpreter 22 and the compression element 24. Somewhere between the PDL interpreter 22 and compression element 24 may further be provided a buffer for temporarily retaining a raw bitmap output by PDL interpreter 22, depending on the specific design of the printer. The shift detector 30 accepts the raw bitmap data output from PDL interpreter 22, and also accepts, such as through an external user interface, indicated as 32, instructions to shift or otherwise reposition the image in the raw bitmap from the PDL file. The external user interface 32 resides at the printer site or client site. This shift instruction from UI 32 may be directly stated, or implied if the printer is instructed, for example, to bind the output prints.

The shift detector 30, having received instructions to shift image data, can work either before, during, or after, the function of compression element 24 to compress the raw bitmap into a compressed form usable by hardware 10, 12, 14. The key function of the shift detector 30 is to detect how much of a shift, as measured in scan lines, is required for the image, and then convey this desired shift to the compressed data which is sent to the hardware. With compression, an instruction such as "print a blank line" or "print X number of blank lines" can be stated with a relatively small amount of code, particularly as compared to providing enough 1's or 0's to embody such an instruction in the raw bitmap. Thus, when the shift detector 30 receives instructions through user interface 32 to move the entire image ½ inch to the right, in a 600 spi resolution printer, the shift detector 30 will recognize that it must add 300 blank lines (such as to blank area B in FIG. 3B) before the start of the image data proper in scan line $S_1$. The shift detector 30 adds these blank lines, in the form of a code consistent with adding such blank lines, to the compressed bitmap data. These added instructions in the compression code will the add the extra blank space B, as shown in FIG. 3B.

Because the pitch on a photoreceptor, or the size of a print sheet, is fixed, adding blank lines to one side of an image will require that an equal number of lines, blank or otherwise, be discarded at the other end of the image, as shown by area E in FIG. 3B. In a data sense, this is the equivalent to adding lines at the beginning of the data file, and removing lines from the end of the data file. (This removal of lines is preferably performed before compression of the data; an advantage of this is that there will be less raw data that needs to be compressed, thus improving compression performance.) In a particular practical embodiment of this concept, there is provided, for every page image to be printed, a software construction known as an "image descriptor." This image descriptor includes data descriptive of the job to be printed, which is also used elsewhere in a networked system. A typical image descriptor in this context will include specifications of, for example, the total number of scan lines in each image space, and the number of bits per scan line. The discarding of the scan lines in area E such as shown in FIG. 3B can be provided by decreasing the scan line count in the image descriptor. However, once the blank lines forming portion B of the image in 3B are added, it may be necessary to re-add those lines in the image descriptor. Specific techniques for carrying out the image shift beyond the essential steps enumerated herein will depend on the specific implementation of a printing system.

A common requirement of a job being printed at a particular site is to print the series of page images in a "duplex" form, that is, on both sides of each page, in the manner of a conventional printed book. In such a case, odd-numbered (right-side) pages will have a different relationship to the binding than even-numbered (left-side) pages. The odd-numbered pages may have to be shifted to provide extra space for the binding on the left edge of each image, while the left-hand pages may need extra space from the binding on the right side of each image. According to a variant of the present invention, the shift detector 30 can be made sensitive to the page number of each individual page image in the PDL file, and perform the image shift only to a subset of page images, such as the odd-numbered page images. In a typical case, odd-numbered pages in the file are shifted to the right, away from the binding, such as by the method of the present invention, and even-numbered pages are shifted to the left. (However, in some practical embodiments of a network printer, shifting of an image in a manner requiring removal, as opposed to addition, of scan lines at the beginning of image data may be a trivial operation which will not require the basic method of the present invention.)

Performing an image shift in the manner of the present invention, highly downstream in the process and without "entering" the original PDL file, provides many practical advantages: if, for example, several independent documents are printed in series in a single binding, it is possible that what was an odd-numbered page in one original document will be printed as an even-numbered page, because the document is being tacked onto another document. With the present invention, whether a page image is odd or even is determined as part of the printing process, and not as part of the document-creation process; therefore, the image shift will always be in the correct direction even if several documents are bound together in novel combinations.

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

I claim:

1. In a digital printing apparatus wherein an image is formed on a surface in response to imagewise digital data, the digital data being submitted to the apparatus in a PDL file, a method of manipulating the digital data to position the image on the surface, comprising the steps of:

interpreting the PDL file to yield a raw bitmap;

detecting shift instructions for positioning the image on the surface, the shift instructions reciting a number of scan lines the image is desired to be shifted;

compressing the raw bitmap according to a compression algorithm, to yield a compressed bitmap; and adding blank-line instructions, according to the compression algorithm, to the compressed bitmap for adding a number of blank lines equal to the number of scan lines the image is desired to be shifted.

2. The method of claim 1, further comprising the step of submitting the compressed bitmap and the blank-line instructions to printing hardware.

3. The method of claim 1, wherein the shift instructions are not embedded in the PDL file.

4. The method of claim 1, further comprising the step of discarding from the raw bitmap an amount of data equal to the predetermined number of scan lines the image is desired to be shifted.

5. The method of claim 1, further comprising the step of identifying, from a set of page images to be printed in series, a subset of page images requiring an image shift; and wherein the adding blank-line instructions step includes adding the blank-line instructions to only the page images in the subset requiring an image shift.

6. An apparatus for processing digital image data embodying an image submitted in a PDL file, and shift instructions to position the image on a surface, comprising:

means for interpreting the PDL file to yield a raw bitmap;

means for detecting the shift instructions, the shift instructions reciting a number of scan lines the image is desired to be shifted;

means for compressing the raw bitmap according to a compression algorithm, to yield a compressed bitmap; and means for adding blank-line instructions, according to the compression algorithm, to the compressed bitmap for adding a number of blank lines equal to the number of scan lines the image is desired to be shifted.

7. The apparatus of claim 6, further comprising means for submitting the compressed bitmap and the blank-line instructions to printing hardware.

8. The apparatus of claim 6, wherein the shift instructions are not embedded in the PDL file.

9. The apparatus of claim 6, further comprising means for discarding, from the raw bitmap, an amount of data equal to the predetermined number of scan lines the image is desired to be shifted.

10. The apparatus of claim 6, further comprising means for identifying, from a set of page images to be printed in series, a subset of page images requiring an image shift; and wherein the adding blank-line instructions means includes means for adding the blank-line instructions to only the page images in the subset requiring an image shift.

* * * * *